United States Patent
Shishikura et al.

(10) Patent No.: US 6,288,203 B1
(45) Date of Patent: Sep. 11, 2001

(54) PROCESSES FOR THE PRODUCTION OF POLYCARBONATE

(75) Inventors: Akihiro Shishikura, Chiba; Seiji Takahashi, deceased, late of Saitama, both of (JP), by Takeo Takahashi, Shige Takahashi, legal heirs

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/068,561

(22) PCT Filed: Nov. 22, 1996

(86) PCT No.: PCT/JP96/03427

§ 371 Date: May 5, 1999

§ 102(e) Date: May 5, 1999

(87) PCT Pub. No.: WO97/19975

PCT Pub. Date: Jun. 5, 1997

(30) Foreign Application Priority Data

Nov. 27, 1995 (JP) .................................................. 7/307324
Dec. 11, 1995 (JP) .................................................. 7-321757

(51) Int. Cl.[7] .................................................. C08G 64/00
(52) U.S. Cl. .......................................... 528/196; 528/198
(58) Field of Search ...................................... 528/196, 198

(56) References Cited

U.S. PATENT DOCUMENTS

| | | | | |
|---|---|---|---|---|
| 4,238,596 | * | 12/1980 | Quinn | 528/179 |
| 4,238,597 | * | 12/1980 | Markezich et al. | 528/179 |
| 4,393,190 | * | 7/1983 | Tyrell et al. | 528/170 |
| 4,506,065 | * | 3/1985 | Miller et al. | 528/194 |
| 4,657,977 | * | 4/1987 | Peters | 525/92 A |
| 4,713,439 | * | 12/1987 | Clair et al. | 528/353 |
| 4,757,150 | * | 7/1988 | Guggenheim et al. | 548/461 |
| 4,948,871 | * | 8/1990 | Fukuoka et al. | 528/481 |
| 5,204,377 | * | 4/1993 | Fukawa et al. | 521/60 |
| 5,414,057 | * | 5/1995 | Campbell et al. | 525/462 |
| 5,717,056 | * | 2/1998 | Varadarajan et al. | 528/196 |

FOREIGN PATENT DOCUMENTS

| | | | |
|---|---|---|---|
| 149888 | * | 6/1995 | (JP) . |
| 53544 | * | 2/2000 | (JP) . |

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

Processes for producing polycarbonate by solid phase polymerization which simplify the crytallization to be conducted prior to the solid phase polymerization to thereby permit further shortening in the treatment time. A process for producing polycarbonate is characterized in that an amorphous polycarbonate prepolymer prepared by transesterification of aromatic dihydroxy compound with a diester of carbonic acid is prepolymerized in a solid phase under an atmosphere containing gaseous swollen solvent while the prepolymer is kept in a fluid state. Another process for producing polycarbonate is characterized in that a mixture comprising an amorphous polycarbonate prepolymer prepared by transesterification of an aromatic dihydroxy compound with a diester of carbonic acid and a polycarbonate prepolymer which has undergone crystallization is prepolymerized in a solid phase under an atmosphere containing a gaseous swollen solvent.

14 Claims, No Drawings

PROCESSES FOR THE PRODUCTION OF POLYCARBONATE

TECHNICAL FIELD

The present invention relates to processes for producing polycarbonate, and more precisely, to a process for producing polycarbonate by direct solid-phase polymerization of an amorphous prepolymer, and to a process for producing polycarbonate by solid-phase polymerization of a mixture comprising an amorphous prepolymer and a crystalline prepolymer.

BACKGROUND ART

At present, the main current of polycarbonate production is interfacial polycondensation that starts from phosgene and bisphenol A and uses a reaction solvent of methylene chloride.

However, phosgene to be used in the interfacial polycondensation is highly toxic, and methylene chloride to be used therein is a halide solvent of which the use shall be much restricted for the protection of the environment. Therefore, the development of novel techniques substitutable for this is desired.

Recently proposed were melt interesterification (transesterification) and solid-phase polymerization.

The melt interesterification is to polymerize a dihydroxy compound and a dicarbonate compound through interesterification of the two in the presence of no solvent; while the solid-phase polymerization is to polymerize a prepolymer under heat in a solid phase.

It is expected that those new techniques solve the problems of the conventional interfacial polymerization and stably give polycarbonate of high quality.

Some methods of solid-phase polymerization have been disclosed, in which a starting, amorphous polycarbonate prepolymer is processed with a solvent or heated for crystallization to make it have a degree of crystallinity of about 20% (melting point: 190 to 210° C.), and then polymerized in a solid phase at about 200° C. or so in an inert gas stream of, for example, nitrogen, argon, helium or carbon dioxide (see Japanese Patent Application Laid-Open (JP-A) Nos. Sho-63-223035, Sho-64-16826, Sho-64-38433). In those, the starting prepolymer is crystallized prior to the solid-phase polymerization to have an elevated melting point so that it can be polymerized in a solid phase at high temperatures within a shortened period of time.

However, where the crystallization treatment is effected under heat in an inert gas stream such as that mentioned above, it is said that it takes a long period of time of from several tens hours to several hundreds hours since the crystallization rate of the prepolymer is very low (see Polycarbonate Resin Handbook, published by Nikkan Kogyo Shinbun Co.).

As in the above, the crystallization treatment is an indispensable pre-treatment for the conventional solid-phase polymerization.

The conventional solid-phase polymerization is effected in an inert gas stream (see Japanese Patent Publication (JP-B) No. Hei-6-99551). The inert gas includes nitrogen, carbon dioxide, argon and helium. However, the essential function of the inert gas used is to lower the partial pressure of the side product formed in a gaseous phase, or that is, to control the diffusion of the side product into the particulate prepolymer being polymerized.

Having known the prior art as above, we, the inventors herein provide the present invention, of which the object is to provide improved processes for producing polycarbonate through solid-phase polymerization. The processes of the invention simplify the step of pre-treatment for crystallization of prepolymers to be effected prior to the solid-phase polymerization, and the time for the processes is much shortened.

DISCLOSURE OF THE INVENTION

The present inventors have assiduously studied, and, as a result, have found that a particulate, substantially amorphous polycarbonate prepolymer, or a mixture comprising such a powder amorphous polycarbonate prepolymer and a particulate crystalline prepolymer can be polymerized in a solid phase, while being kept in a fluid state under an atmosphere containing a swelling solvent gas, with no troubles of fusion or blocking of the prepolymer grains being polymerized. On the basis of this finding, the inventors have completed the present invention.

Specifically, the present invention is summarized as follows.

1. A process for producing polycarbonate, which comprises polymerizing a substantially amorphous polycarbonate prepolymer in a solid phase under an atmosphere containing a swelling solvent gas.
2. A process for producing polycarbonate, which comprises polymerizing a substantially amorphous polycarbonate prepolymer in a solid phase under an atmosphere containing a swelling solvent gas, while the prepolymer is kept in a fluid state.
3. The process for producing polycarbonate of 1 or 2, wherein the solid-phase polymerization is effected under an atmosphere containing a swelling solvent gas and at least one gas selected from poor solvent gases and inert gases.
4. The process for producing polycarbonate of any one of 1 to 3, wherein a mixture comprising a substantially amorphous polycarbonate prepolymer and a crystalline polycarbonate prepolymer is polymerized.
5. The process for producing polycarbonate of any one of 1 to 4, wherein the substantially amorphous polycarbonate prepolymer is a particulate one.
6. The process for producing polycarbonate of 4 or 5, wherein the crystalline polycarbonate prepolymer is a particulate one.

BEST MODES OF CARRYING OUT THE INVENTION

Typical embodiments of the present invention are described in detail hereinunder.

The processes for producing polycarbonate of the invention include (A) a step of preparing a starting material of an amorphous polycarbonate prepolymer, (B) a step of preparing a starting material of a mixture comprising an amorphous polycarbonate prepolymer and a crystalline polycarbonate prepolymer, and (C) a step of polymerizing particulates of the starting material in a swollen solid phase under an atmosphere containing a swelling solvent gas to give polycarbonate. These steps are described in detail.

(A) Step of Preparing Amorphous Polycarbonate Prepolymer

The amorphous polycarbonate prepolymer to be subjected to solid-phase polymerization in the invention may be prepared in any known method of, for example, interfacial polymerization or melt interesterification.

The solid-phase polymerization in the invention is for condensation of prepolymer, and consists essentially of interesterification of the carbonate group, such as an aryl or alkyl carbonate group constituting one terminal of the prepolymer with the hydroxyl group constituting the other terminal thereof. Therefore, for this, the constitutional ratio of the terminal groups of the prepolymer, or that is, the ratio of the former to the latter is generally from 0.1/1 to 5/1, but preferably from 0.5/1 to 2/1, more preferably from 0.8/1 to 1.4/1, by mol, in view of the reaction efficiency.

In order to produce the prepolymer having such a predetermined constitutional ratio of the terminal groups through interfacial polymerization, prepolymers having been once prepared must be so processed that they have the desired, predetermined constitutional ratio of the terminal groups, for example, by blending a phenol-terminated carbonate prepolymer and a hydroxyl-terminated carbonate prepolymer both having been prepared separately, in a suitable ratio to make the prepolymer blend have the intended constitutional ratio of the terminal groups. As opposed to the interfacial polymerization that requires the post-treatment, preferred is interesterification capable of easily producing the intended prepolymer having the intended constitutional ratio of the terminal groups.

Therefore, hereinunder described in detail is the interesterification to give the prepolymer for use in the invention.

As the starting materials, most generally used are aromatic dihydroxy compounds as combined with dicarbonate compounds.

Of those, the aromatic dihydroxy compounds include, for example, bis(hydroxyaryl)alkanes such as bis(4-hydroxyphenyl)methane, bis(3-methyl-4-hydroxyphenyl) methane, 1,1-bis(4-hydroxyphenyl)ethane, 1,1-bis(2-t-butyl-4-hydroxy-3-methylphenyl)ethane, 1,1-bis(2-t-butyl-4-hydroxy-3-methylphenyl)ethane, 2,2-bis(4-hydroxyphenyl)propane (bisphenol A: BPA), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-t-butyl-4-hydroxy-5-methylphenyl)propane, 2,2-bis(4-hydroxyphenyl)butane, 2,2-bis(4-hydroxyphenyl)octane, 2,2-bis(4-hydroxyphenyl) phenylmethane, 2,2-bis(4-hydroxy-1-methylphenyl) propane, 1,1-bis(4-hydroxy-t-butylphenyl)propane, 2,2-bis (4-hydroxy-3,5-dimethylphenyl)propane, 2,2-bis(3-phenyl-4-hydroxyphenyl)propane, 2,2-bis(4-hydroxyphenyl) butane, 2,2-bis(3-methyl-4-hydroxyphenyl)butane, 1,1-bis (2-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 1,1-bis(2-t-butyl-4-hydroxy-5-methylphenyl)heptane, 2,2-bis(4-hydroxyphenyl)octane, 1,1-(4-hydroxyphenyl)ethane, etc.; bis(hydroxyaryl)cycloalkanes such as 1,1-bis(4-hydroxyphenyl)cyclopentane, 1,1-bis(4-hydroxyphenyl) cyclohexane, 1,1-bis(3-methyl-4-hydroxyphenyl) cyclohexane, 1,1-bis(3-cyclohexyl-4-hydroxyphenyl) cyclohexane, 1,1-bis(3-phenyl-4-hydroxyphenyl) cyclohexane, 1,1-bis(4-hydroxyphenyl)-3,5,5-trimethylcyclohexane, etc.; bis(hydroxyaryl) ethers such as bis(4-hydroxyphenyl) ether, bis(4-hydroxy-3-methylphenyl) ether, etc.; bis(hydroxyaryl)sulfides such as bis(4-hydroxyphenyl)sulfide, bis(3-methyl-4-hydroxyphenyl) sulfide, etc.; bis(hydroxyaryl)sulfoxides such as bis(4-hydroxyphenyl)sulfoxide, bis(3-methyl-4-hydroxyphenyl) sulfoxide, bis(3-phenyl-4-hydroxyphenyl)sulfoxide, etc.; bis(hydroxyaryl)sulfones such as bis(4-hydroxyphenyl) sulfone, bis(3-methyl-4-hydroxyphenyl)sulfone, bis(3-phenyl-4-hydroxyphenyl)sulfone, etc.; and dihydroxybiphenyls such as 4,4'-dihydroxybiphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl, 3,3'-difluoro-4, 4'-dihydroxybiphenyl, etc.

Any of the aromatic dihydroxy compounds mentioned above can be used in the invention. Of those, preferred is bisphenol A as its quality is stable and it can be supplied stably.

The dicarbonate compounds include, for example, diaryl carbonates, dialkyl carbonates, and alkylaryl carbonates. The diaryl carbonates include, for example, diphenyl carbonate, ditolyl carbonate, bis(chlorophenyl) carbonate, bis(m-cresyl) carbonate, dinaphthyl carbonate, bis (diphenyl) carbonate, bisphenol A bisphenyl carbonate, etc.

The alkyl carbonates include, for example, diethyl carbonate, dimethyl carbonate, dibutyl carbonate, dicyclohexyl carbonate, bisphenol A bismethyl carbonate, etc.

The alkylaryl carbonates include, for example, methylphenyl carbonate, ethylphenyl carbonate, butylphenyl carbonate, cyclohexylphenyl carbonate, bisphenol A methylphenyl carbonate, etc.

Any of the dicarbonate compounds mentioned above can be used in the invention. Of those, preferred is diphenyl carbonate.

To feed those two starting materials, an aromatic dihydroxy compound and a dicarbonate compound, to a polymerization reactor, the aromatic dihydroxy compound and the dicarbonate compound are, after having been melted together or separately, fed into the reactor, or alternatively, a powder of the dicarbonate compound is added to a melt of the aromatic dihydroxy compound, melted together and then fed into the reactor.

During the polymerization of those two, the non-reacted dicarbonate compound that may be discharged out of the reactor is directly influenced by the reaction temperature and the pressure in the reactor. Therefore, in order to control the reaction temperature and the pressure therein, it is desirable that the degree of reaction is calculated from the flow rate of the side products such as phenols and alkanes being discharged out of the reactor and from the viscosity of the prepolymer as sampled, for the feedback control of the reactants.

In order to enhance the recovery of phenols and other side products to be discharged out of the reactor, a filling tower or a distillation tower may be provided between the reactor and a condenser as connecting therewith, whereby the amount of the dicarbonate compound that may be discharged out of the reactor can be reduced.

Any known polymerization reactors are employable for the polymerization. For example, preferred are vertical or horizontal reactors protected with a jacket and equipped with a stirrer.

Any of single-stage or multi-stage reaction modes are employable, for which one or more reactors may be used as combined in series or in parallel.

Regarding the reaction condition for the production of prepolymer through melt interesterification, the temperature is settled to fall between 100 and 300° C., but preferably between 150 and 280° C., and the pressure to fall between 1 Torr and 5 kg/cm$^2$G, but preferably between 10 Torr and 2 kg/cm$^2$G. Too low reaction temperature is unfavorable as it interferes with the interesterification, while too high reaction temperature is also unfavorable as the reactant, dicarbonate such as diphenyl carbonate is discharged out of the reaction system along with phenols and other side products.

Too high reaction pressure is unfavorable, as it prevents phenols and other side products from being discharged out of the reaction system and interferes with the condensation reaction.

Too low reaction pressure is also unfavorable, as the reactant, dicarbonate such as diphenyl carbonate is discharged out of the reaction system whereby the compositional ratio of the reactants in the system is varied.

Any batchwise or continuous process or even a combined batchwise/continuous system is employable for the polymerization. To prepare uniform prepolymer, however, preferred is continuous polymerization.

If desired, a polymerization catalyst may be used.

In general, used is an interesterification catalyst, which includes, for example, alkali metal compounds (e.g., lithium hydroxide, sodium hydroxide, potassium hydroxide), alkaline earth metal compounds, nitrogen-containing basic compounds such as amines and quaternary ammonium salts, and boron compounds.

If used, especially preferred are nitrogen-containing basic compounds, as they are basic and remain little in the reaction system.

As the nitrogen-containing basic compounds, preferably used are trihexylamine, tetramethylammonium hydroxide, tetrabutylammonium hydroxide and dimethylpyridine.

The boron compounds include, for example, boric acid, trimethyl borate, triethyl borate, tributyl borate, triheptyl borate, triphenyl borate, and trinaphthyl borate.

The amount of the catalyst to be added may be generally from $1 \times 10^{-8}$ to $10^{-1}$ mol/mol, preferably from $1 \times 10^{-7}$ to $10^{-2}$ mol/mol, relative to the reactant, aromatic dihydroxy compound.

If the amount of the catalyst added is smaller than $1 \times 10^{-8}$ mol/mol, the catalyst will be often ineffective.

However, if the amount is larger than $1 \times 10^{-1}$ mol/mol, too much catalyst added will have negative influences on the physical properties of the final product, polycarbonate, especially the heat resistance and the hydrolysis resistance thereof. If so, in addition, the products costs will increase. For these reasons, the addition of the catalyst in such a large amount over the range noted above is unnecessary.

The amorphous polycarbonate prepolymer to be used as the starting material for the solid-phase polymerization of the invention generally has a viscosity-average molecular weight of from 1000 to 30000, but preferably from 4000 to 15000.

Polycarbonate prepolymers having a low molecular weight shall have a low melting point. Using such low-molecular polycarbonate prepolymers lowers the uppermost limit of the reaction temperature for the solid-phase polymerization, thereby resulting in the slowdown of the reaction. For polycarbonate prepolymers having a molecular weight of larger than 30,000, the molecular weight is satisfactorily high for general use of polycarbonate, and there is little necessity for further increasing the molecular weight of the prepolymers through additional solid-phase polymerization.

The prepolymer as prepared according to the method mentioned above is granulated into particulates.

For the granulation, any known method is employable.

For example, employable is any of rotary granulation, extrusion granulation, compression granulation, melt granulation, spray-dry granulation, fluidized bed granulation, grinding granulation, stirring granulation, liquid-phase granulation, and vacuum-freezing granulation.

Effectively employed is stirring granulation in which a prepolymer is dissolved in a swelling solvent and then granulated while being mixed with a poor solvent for the prepolymer. Where the prepolymer particulates as granulated in that manner are subjected to solid-phase polymerization using a swelling solvent and a poor solvent, they do not require drying prior to the polymerization.

The shape of the granulated prepolymer particulates is not specifically defined, but preferred are pellets, beads, granules and powders. Also preferred are aggregates or porous aggregates of fine grains. Melt interesterification to give fine grains of prepolymer is preferably followed by aggregation of the fine grains.

The specific surface area of the prepolymer particulates for use in the invention is preferably not smaller than 0.3 $m^2/g$.

The grain size of the particulates may fall between 10 microns and 10 cm, but preferably between 100 microns and 2 cm.

Too fine particulates having a small grain size are unfavorable to the solid-phase polymerization of the invention, as the fine powder will be scattered outside the reactor by the stream of the swelling solvent gas thereby clogging the valves and the ducts around the reactor while having some negative influences on the solvent recovery step, or causing various troubles of fusion, blocking and bridging.

Too great particulates having a large grain size are also unfavorable, as the distance at which the solvent and the side products diffuse shall be enlarged, thereby prolonging the reaction time.

The particulate polycarbonate prepolymer as prepared in the manner mentioned above is substantially amorphous, generally having a degree of crystallinity of not larger than 5%. In the invention, this can be directly subjected to solid-phase polymerization to increase its molecular weight, without being subjected to any particular pre-treatment prior to the polymerization.

(B) Step of Preparing Mixture Comprising Amorphous Polycarbonate Prepolymer and Crystalline Polycarbonate Prepolymer The crystalline polycarbonate prepolymer to be in the mixture of a starting material for use in the invention can be prepared by crystallizing an amorphous polycarbonate prepolymer such as that prepared above.

For the crystallization, for example, employable is a method of dissolving an amorphous polycarbonate prepolymer in a swelling solvent which will be used in the solid-phase polymerization step to give a solution having a prepolymer concentration of from 5% by weight to 90% by weight, followed by cooling the resulting solution to form a precipitate of fine crystalline grains; a method of spraying a swelling solvent over an amorphous polycarbonate prepolymer followed by cooling the thus-sprayed prepolymer to form fine crystalline grains; or a method of grinding an amorphous polycarbonate prepolymer in a crusher or mill followed by processing it with a crystallizing solvent such as a swelling solvent into fine crystalline grains. The degree of crystallinity of the crystalline prepolymer thus prepared is preferably between 25 and 60% or so. Crystalline prepolymers having a degree of crystallinity of lower than 25% are not so advantageous, as the amount of the amorphous prepolymer capable of being combined with them shall be small. Those having a degree of crystallinity of larger than 60% are difficult to prepare, and the time for the crystallization to give them shall be to much prolonged.

The powdery mixture comprising an amorphous polycarbonate prepolymer and a crystalline polycarbonate prepolymer may be directly subjected to the solid-phase polymerization of the invention, but may be re-granulated in any known manner prior to being subjected thereto. For example, the mixture may be re-granulated in any manner of, for example, rotary granulation, extrusion granulation, compression granulation, melt granulation, spraying granulation, fluidized-bed granulation, grinding granulation, stirring granulation or liquid-phase granulation. If desired, two or more of those granulation means may be combined.

A part of an amorphous polycarbonate prepolymer to be subjected to solid-phase polymerization may be crystallized and mixed with a different amorphous polycarbonate prepolymer prior to being subjected to solid-phase polymerization, and the resulting mixture comprising the amorphous polycarbonate prepolymer and the crystalline polycarbonate prepolymer may be used as the starting material for the solid-phase polymerization of the invention. To prepare a mixture comprising an amorphous prepolymer and a crystalline prepolymer, which is used as the starting material for the solid-phase polymerization, employable is any of a method of previously mixing the two followed by granulating the resulting mixture in the manner mentioned above; a method of separately feeding the two into different granulators and separately granulating them therein; or a method of separately feeding the two into one and the same polymerization reactor and mixing them therein. The mixing ratio of the crystalline prepolymer to the amorphous prepolymer may be generally such that the amount of the crystalline prepolymer is from 30 to 90% by weight while that of the amorphous prepolymer is from 10 to 70% by weight. Especially preferred is a mixture comprising from 30 to 90% by weight of a crystalline prepolymer and having an apparent degree of crystallinity of not smaller than 20%.

The shape of the prepolymer mixture particulates is not specifically defined, but preferred are pellets, beads, granules and powders. Also preferred are aggregates or porous aggregates of fine grains.

The grain size of the prepolymer mixture particulates, depending on the handlability of the particulates and on the flow rate of the swelling solvent gas to be applied thereto in the next solid-phase polymerization step, may fall between 10 microns and 5 cm, but preferably between 100 microns and 1 cm. Too fine particulates having a small grain size are unfavorable to the solid-phase polymerization of the invention, as the fine powder will scatter in the stream of the swelling solvent gas thereby clogging the valves and the ducts in the reaction system while having some negative influences on the solvent recovery step. Too great particulates having a large grain size are also unfavorable, as the distance at which the swelling solvent can diffuse shall be so enlarged that it is ineffective, thereby prolonging the reaction time.

The specific surface area of the prepolymer mixture particulates is preferably not smaller than 0.15 $m^2/g$. Particulates having a too small surface area can be ground into finer ones. Using the thus-ground particulates could ensure rapid reaction.

(C) Polymerization Step for Increasing the Molecular Weight of Prepolymer

In step (C), the prepolymer particulates as prepared in the previous steps (A) and (B) are polymerized under an atmosphere containing a swelling solvent gas to increase the molecular weight of the prepolymer.

In this step where the prepolymer particulates are polymerized in a solid phase under an atmosphere containing a swelling solvent gas, it is desirable that the particulates are kept in a fluid state during the solid-phase polymerization in the atmosphere. Where the amorphous polycarbonate prepolymer particulates prepared in (A) are polymerized by themselves in a solid phase, it is desirable that they are kept in a fluid state and polymerized in a solid phase under an atmosphere containing a swelling solvent gas as the degree of the crystallinity of the prepolymer particulates being polymerized is rapidly increased. On the other hand, where the mixture particulates as prepared in (B), which comprises an amorphous polycarbonate prepolymer and a crystalline polycarbonate prepolymer, are polymerized, it is not always necessary to keep them in a fluid state while they are polymerized in a solid phase under an atmosphere containing a swelling gas solvent, but in order to attain a higher reaction speed, it is preferable to keep them in a fluid state during their polymerization.

The condition for the polymerization is generally such that the temperature falls between 100 and 320° C., but preferably between 180 and 280° C., and the pressure falls between 10 Torr and 5 $kg/cm^2$, but is preferably an atmospheric pressure.

Where the prepolymer particulates prepared in (A) are polymerized, in general, their temperature at the start of the polymerization must be not higher than the melting point of the prepolymer (for example, the prepolymer having a viscosity-average molecular weight of 5920 and a degree of crystallinity of 2.3% has a melting point of 143° C.). According to the present invention, however, even the polymerization of the prepolymer particulates prepared in (A) can be started at a temperature higher than the melting point of the prepolymer if the particulates being polymerized are kept in a fluid state, whereby the reaction time can be much more shortened. Concretely, the prepolymer particulates are stirred or vibrated to keep them in a fluid state, whereby they can be stably polymerized in a solid phase without being fused together. In addition, the crystallization rate of the prepolymer being polymerized is accelerated by the action of the swelling solvent gas used during the polymerization. Therefore, in the present invention, even substantially amorphous prepolymer particulates having a degree of crystallinity of not larger than 5% can be effectively polymerized in a solid phase.

The degree of fluidization of the prepolymer particulates may be so determined that the particulates being polymerized are not fused together. The optimum condition for the fluidization varies, depending on the fluidization method employed and on the area of the cross section of the reactor employed. In one example where the particulates are fluidized by stirring, the peripheral speed of the tip of the stirring blade may be generally from 15 to 150 cm/sec, but preferably from 20 to 130 cm/sec. When the prepolymer particulates are, while kept in a fluid state, gently stirred under an atmosphere containing a swelling solvent gas, the degree of crystallinity of the particulates reaches 20% or so within several minutes to several tens minutes. This means that, when the prepolymer particulates are, while kept in a swollen state, stirred, the degree of crystallinity of the particulates reaches 20% or so within several minutes to several tens minutes.

In this polymerization step, the prepolymer particulates as prepared in the previous step (A) or (B) are swollen to be in a swollen state, under an atmosphere containing a swelling solvent gas, and polymerized to increase the molecular weight of the prepolymer. The swollen state as referred to herein indicates that the volume or the weight of the prepolymer particulates being polymerized has been increased in the polymerization reaction condition, or that is, the prepolymer particulates have absorbed the swelling solvent in that condition and thereby have expanded to a degree higher than the degree of mere thermal expansion with respect to their volume or weight.

As the swelling solvent, preferred is one which can form the "swollen state" noted above while having a boiling point or a corresponding vapor pressure (50 mmHg or higher, preferably 200 mmHg or higher) so that it can completely vaporize under the polymerization reaction condition, and which can dissolve a polycarbonate having a viscosity-average molecular weight of 22000 at 135° C. in an amount of from 1.5 to 50% by weight.

The solubility of polycarbonate in the solvent is measured as follows: 300 g of a polycarbonate having a viscosity-average molecular weight of 22000 is added to 300 g of a solvent at room temperature in a pressure autoclave made of glass, sealed and kept therein at 135° C. for 2 hours, and the amount of the polycarbonate dissolved in the solvent is measured.

The swelling solvent of that type includes, for example, aromatic compounds and oxygen containing compounds having a solubility parameter falling between 4 and 20 $(cal/cm^3)^{1/2}$ or so, preferably between 7 and 14 $(cal/cm^3)^{1/2}$ or so. Solvents having a functional group of which the hydrogen-bonding ability is relatively high, such as hydroxyl group, carboxyl group, amino group, amido group, cyano group, nitro group, sulfone group and the like, should not be used herein, as they may participate in the interesterification at temperatures higher than 150° C. Under a high temperature condition above 200° C., it is desirable not to use ketone and ether compounds. Halide solvents are also unfavorable, as they pollute the environment.

As specific examples of the swelling solvent for use in the invention, mentioned are aromatic hydrocarbons (e.g., benzene, toluene, xylene, ethylbenzene, diethylbenzene, propylbenzene, dipropylbenzene, etc.), ethers (e.g., tetrahydrofuran, dioxane, anisole, etc.), and ketones (e.g., methyl ethyl ketone, methyl isobutyl ketone, etc.). Preferred are aromatic hydrocarbons having from 6 to 20 or so carbon atoms, which may be used either singly or as combined.

To control the swollen state of the reaction system, the swelling solvent may be combined with a poor solvent for the prepolymer or the polymerized polymer thereof.

The poor solvent is such that the solubility therein of a polycarbonate having a viscosity-average molecular weight of 22000 at 135° C. is not larger than 0.1% by weight, and the solvent does not participate in the polymerization reaction.

The poor solvent of that type includes, for example, cyclic hydrocarbons having from 5 to 20, preferably from 5 to 10 carbon atoms, linear or branched, saturated hydrocarbons having from 4 to 18, preferably from 6 to 12 carbon atoms, and unsaturated lower hydrocarbons having from 6 to 10 carbon atoms, which have a solubility parameter of from 4 to 20 $(cal/cm^3)^{1/2}$, preferably from 6 to 12 $(cal/cm^3)^{1/2}$. One or more of those poor solvents maybe combined with the swelling solvent. As specific examples of the poor solvent, mentioned are heptane, octane, nonane and cyclohexane.

If the swelling solvent and the poor solvent used both have a boiling point of higher than 250° C., those remaining in the reaction system are difficult to remove, and will often worsen the quality of the polymer produced.

Where a mixed solvent comprising a swelling solvent and a poor solvent is used, it shall contain the swelling solvent in an amount of not smaller than 1% by weight, but preferably not smaller than 5% by weight. Using the mixed solvent of that type increases the reaction speed.

Both the swelling solvent and the poor solvent for use in the invention should not have a functional group of which the hydrogen-bonding ability is relatively high, such as hydroxyl group, carboxyl group, amino group, amido group, cyano group, nitro group, sulfone group and the like. This is because solvents having such a functional group may participate in the interesterification at temperatures higher than 150° C. Halide solvents are also unfavorable, as they pollute the environment.

The swelling solvent gas may be combined with an inert gas. For the mixed system comprising a swelling solvent gas and an inert gas, referred to is the same as that for the mixed system comprising a swelling solvent and a poor solvent mentioned above. Specifically, also in the mixed system comprising a swelling solvent gas and an inert gas, the type of the swelling gas and the amount thereof to be therein shall satisfy the requirements mentioned above.

The inert gas includes, for example, nitrogen, carbon dioxide, argon and helium. One or more of those may be combined with the swelling solvent.

The flow rate of the gaseous stream containing a swelling solvent gas in the solid-phase polymerization reactor may be generally not lower than 0.001 cm/sec, but preferably not lower than 0.01 cm/sec.

This is because, if the gaseous flow rate is not lower than the defined range, the concentration of phenols and other side products formed in the solid phase could be lowered and the reaction speed could be kept high.

The reactor to be used for the polymerization in the invention is not specifically defined. Any conventional reactors are employable herein, including, for example, stirring reactors, tumbler reactors, kiln reactors, paddle drier reactors, screw conveyor reactors, vibration reactors, fluidized-bed reactors, fixed-bed reactors, mobile-bed reactors, etc. These may be used either singly or as combined.

In one example where amorphous polycarbonate prepolymer particulates prepared in (A) mentioned above are polymerized by themselves in a solid phase, using a stirring reactor, it is desirable that the reactor is equipped with single-helical or double-helical blades and that the particulates are stirred with those blades to such a degree that their shape is not broken, generally at a rate of from 15 to 150 cm/sec in terms of the peripheral speed of the tip of each stirring blade.

Stirring at a too high speed breaks the shape of the prepolymer particulates, whereby fine powder formed will adhere to the heat-transferring site of the reactor, often causing troubles of the reduction in the melting and heat-transferring efficiency and the increase in the torque of the stirring shaft.

For drying and pelletizing the high-molecular polycarbonate having been produced according to the processes of the invention, employable are any conventional methods with no specific restrictions. Where additives such as a terminating agent and an antioxidant are added to the polycarbonate produced, a powdery additive may be directly applied to flakes of the polycarbonate before or after drying the flakes, or a liquid additive may be sprayed over them to thereby make the polymer absorb the vapor of the additive. If desired, the polymer may be mixed with the additives in an extruder prior to being pelletized therethrough.

As specific examples of the terminating agent employable herein, mentioned are monophenols, such as o-n- butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, and 3,5-dicumylphenol.

Of those phenols, p-tert-butylphenol, p-cumylphenol and p-phenylphenol are preferred but are not limitative.

If desired, an antioxidant is usable in the invention. For example, phosphorus-containing antioxidants are employable, which may include trialkyl phosphites such as tri(nonylphenyl) phosphite, 2-ethylhexyldiphenyl phosphite, trimethyl phosphite, triethyl phosphite, tributyl phosphite, trioctyl phosphite, trinonyl phosphite, tridecyl phosphite, trioctadecyl phosphite, distearylpentaerythrityl diphosphite, tris(2-chloroethyl) phosphite, tris(2,3-dichloropropyl) phosphite, etc.; tricycloalkyl phosphites such as tricyclohexyl phosphite, etc.; triaryl phosphites such as triphenyl phosphite, tricresyl phosphite, tris(ethylphenyl) phosphite, tris(butylphenyl) phosphite, tris(nonylphenyl) phosphite, tris(hydroxyphenyl) phosphite, etc.; trialkyl phosphates such as trimethyl phosphate, triethyl phosphate, tributyl phosphate, trioctyl phosphate, tridecyl phosphate, trioctadecyl phosphate, distearylpentaerythrityl phosphate, tris(2-chloroethyl) phosphate, tris(2,3-dichloropropyl) phosphate, etc.; tricycloalkyl phosphates such as tricyclohexyl phosphate, etc.; and triaryl phosphates such as triphenyl phosphate, tricresyl phosphate, tris(nonylphenyl) phosphate, 2-ethylphenyldiphenyl phosphate, etc.

Now, the invention is described in more detail with reference to the following Examples.

Examples 1 to 3 are to demonstrate solid-phase polymerization of amorphous polycarbonate prepolymer particulates of (A) by themselves; Comparative Examples 1 and 2 are to be compared with those Examples 1 to 3; Examples 4 to 8 are to demonstrate solid-phase polymerization of a mixture of (B) comprising amorphous polycarbonate prepolymer particulates and crystalline polycarbonate prepolymers; and Comparative Examples 3 and 4 are to be compared with those Examples 4 to 8.

EXAMPLE 1

A 10-liter autoclave equipped with a stirrer, an inert gas-introducing duct and a phenol gas-discharging duct were charged with 2283 g of bisphenol A and 249 g of diphenyl carbonate, and vacuum deaeration and nitrogen introduction were repeated, after which the contents were heated to 180° C. to completely melt the same. Vacuum deaeration and nitrogen introduction were repeated again, and then 0.0025 mols of NaOH and 0.0001 mols of TMAH (tetramethylammonium hydroxide), which were catalysts, were added each in the form of an aqueous solution to start the reaction. Simultaneously with starting the reaction, the pressure was reduced to 300 mmHg for removing the phenol produced as a side product out of the system, and then gradually to 150 mmHg with heating up to 220° C., for which the reaction time was 1.1 hours. Then, the degree of vacuum was gradually reduced to 12 Torr with further heating up to 270° C., and the reaction was effected for further 1.4 hours. After completion of the reaction, nitrogen was introduced into the reactor to restore the internal pressure to atmospheric pressure, and the contents were taken out little by little and dropped into water to be solidified. The thus-solidified prepolymer was ground, using a crusher and a mill. Thus was obtained 2370 g of a prepolymer powder having a mean grain size of 0.13 mm. This prepolymer had a viscosity-average molecular weight of 6210, and a degree of crystallinity of 0.4%, and its phenyl carbonate terminal content and hydroxyl terminal content were 52 mol % and 48 mol %, respectively.

100 g of the prepolymer powder prepared above was put into a 500-ml glass autoclave equipped with a stirrer, which was heated at 210° C. and of which the stirrer was set at a revolution rate of 130 rpm (this corresponds to a peripheral speed of 52 cm/sec at the tip of the blade of the stirrer), while toluene containing 50 vol. % of nitrogen (in terms of the volume ratio at the reaction temperature) and having been heated at 210° C. was introduced thereinto at a flow rate of 2.3 cm/sec, and the prepolymer was polymerized in the autoclave for 2 hours under the defined condition.

Immediately after the start of the polymerization, the prepolymer powder was seen to adhere onto the wall surface of the reactor, but after 15 minutes, any specific adhesion was not seen and the system was kept well stirred. The polymerized powder had a degree of crystallinity of 32.3%, a melting point of 248° C. and a viscosity-average molecular weight of 32100. A sample of the polymer obtained was shaped into plates through melt compression, and the plates were found colorless and transparent.

EXAMPLE 2

100 g of the prepolymer powder prepared in Example 1 was put into a 500-ml glass autoclave equipped with a stirrer, which was heated at 210° C. and of which the stirrer was set at a revolution rate of 130 rpm (this corresponds to a peripheral speed of 52 cm/sec at the tip of the blade of the stirrer), while toluene containing 5 wt. % of n-heptane and having been heated at 210° C. was introduced thereinto at a flow rate of 3.3 cm/sec, and the prepolymer was heated for 0.5 hours under the defined condition, and then for 2 hours at an elevated temperature of 220° C.

Immediately after the start of the polymerization, the prepolymer powder was seen to adhere onto the wall surface of the reactor, but after 18 minutes, any specific adhesion was not seen and the system was kept well stirred. The polymerized powder had a degree of crystallinity of 33.7%, a melting point of 252° C. and a viscosity-average molecular weight of 34200. A sample of the polymer obtained was shaped into plates through melt compression, and the plates were found colorless and transparent.

EXAMPLE 3

The same process as in Example 2 was repeated herein, except that 500 g of the prepolymer powder prepared in Example 1 was polymerized in a horizontal stirring reactor (500 ml) equipped with a paddle blade into which was introduced p-xylene containing 50 wt. % of n-heptane.

Immediately after the start of the polymerization, the prepolymer powder was seen to adhere onto the wall surface of the reactor, but after 8 minutes, any specific adhesion was not seen and the system was kept well stirred. The polymerized powder had a degree of crystallinity of 35.1%, a melting point of 255° C. and a viscosity-average molecular weight of 38300. A sample of the polymer obtained was shaped into plates through melt compression, and the plates were found colorless and transparent. The steam resistance of the plates was comparable to that of plates of a polycarbonate having been prepared through conventional interfacial polycondensation, and was good.

COMPARATIVE EXAMPLE 1

100 g of the prepolymer powder prepared in Example 1 was put into a 500-ml autoclave, melted at 260° C., and reacted for 2 hours therein while being heated up to 290° C. and well stirred under a pressure of 0.6 Torr. The polymer obtained herein had a viscosity-average molecular weight of 27800. However, opposed to the colorless polymers obtained in the above-mentioned Examples, the polymer obtained herein was much colored in dark brown even though the melt interesterification was effected herein with full purging with nitrogen.

COMPARATIVE EXAMPLE 2

100 g of the prepolymer powder prepared in Example 1 was put into a fixed-bed reactor made of SUS and having a diameter of 5 cm and a length of 30 m, and polymerized therein at 20° C. for 2 hours while nitrogen was introduced thereinto at a flow rate of 3.4 cm/sec.

After the polymerization, the reactor was opened, in which was found glassy deposits formed on its wall surface. This suggests that the product would have melted. In order to recover the product, only one means employable herein was to use methylene chloride to dissolve it. As no swelling solvent existed in the reaction system, the degree of crystallinity of the polymer produced was increased, resulting in that the polymer was melted in the reactor. This indicates that a prepolymer having a degree of crystallinity of lower than 5% could not be directly polymerized through conventional solid-phase polymerization. A sample of the product obtained herein was found to have a viscosity-average molecular weight of 8700, and plates formed from it through melt compression were very brittle.

EXAMPLE 4

A 10-liter autoclave equipped with a stirrer, an inert gas-introducing duct and a phenol gas-discharging duct were charged with 2283 g of bisphenol A (2,2-bis(4-hydroxyphenyl)propane) and 2249 g of diphenyl carbonate, and vacuum deaeration and nitrogen introduction were repeated, after which the contents were heated to 180° C. to completely melt the same. Vacuum deaeration and nitrogen introduction were repeated again, and then 0.0025 mols of NaOH and 0.0001 mols of TMAH (tetramethylammonium hydroxide), which were catalysts, were added each in the form of an aqueous solution to start the reaction. Simultaneously with starting the reaction, the pressure was reduced to 300 mmHg for removing the phenol produced out of the system, and then gradually to 150 mmHg with heating up to 220° C., for which the reaction time was 1.1 hours. Then, the degree of vacuum was gradually reduced to 12 Torr with further heating up to 270° C., and the reaction was effected for further 1.4 hours. After completion of the reaction, nitrogen was introduced into the reactor to restore the internal pressure to atmospheric pressure, and the contents were taken out little by little and dropped into water to be solidified. The thus-solidified prepolymer was ground, using a crusher and a mill. Thus was obtained 2410 g of an amorphous prepolymer powder having a mean grain size of 0.13 mm. This amorphous prepolymer had a viscosity-average molecular weight of 6400, and a degree of crystallinity of 0.4%, and its phenyl carbonate terminal content and hydroxyl terminal content were 53 mol % and 47 mol %, respectively.

To prepare a crystalline prepolymer, 1100 g of the amorphous prepolymer prepared above was melted at 250° C., and dissolved in 740 g of p-xylene. The resulting solution was cooled to room temperature to solidify the prepolymer. This was dried in vacuum to remove the solvent. The prepolymer thus obtained had an increased degree of crystallinity of 36.2%, but its molecular weight and terminal contents did not change.

To prepare a prepolymer mixture of the crystalline prepolymer and the amorphous prepolymer both produced in the above, 150 g of the crystalline prepolymer and 100 g of the amorphous prepolymer powder were mixed, shaped under compression at a low temperature, and then ground. Thus was obtained the intended prepolymer mixture having a mean grain size of 0.52 mm.

100 g of the prepolymer mixture powder prepared above was put into a 500-ml glass autoclave equipped with a stirrer, which was heated at 220° C. and of which the stirrer was set at a revolution rate of 130 rpm, while toluene containing 50 vol. % of nitrogen (in terms of the volume ratio at the reaction temperature) and having been heated at 220° C. was introduced thereinto at a flow rate of 3.3 cm/sec, and the prepolymer mixture was polymerized in the autoclave for 2 hours under the defined condition.

The thus-obtained polymer particulates had a viscosity-average molecular weight of 31700. A sample of the polymer particulates obtained was shaped into plates through melt compression, and the plates were found colorless and transparent. During the polymerization, no troubles of fusion and blocking occurred.

EXAMPLE 5

The same process as in Example 4 was repeated, except that 100 g of the prepolymer mixture (of crystalline prepolymer and amorphous prepolymer) prepared in Example 4 was fed into a horizontal stirring reactor (500 ml) equipped with a paddle blade, and that xylene containing 48 vol % of nitrogen (in terms of the volume ratio at the reaction temperature) was used as the swelling solvent gas mixture.

The polymer particulates obtained herein had a viscosity-average molecular weight of 33400. A sample of the polymer particulates obtained was shaped into plates through melt compression, and the plates were found colorless and transparent. During the polymerization, no troubles of fusion and blocking occurred.

EXAMPLE 6

100 g of the prepolymer mixture (of crystalline prepolymer and amorphous prepolymer) prepared in Example 4 was put into a fixed-bed reactor made of SUS and having a diameter of 5 cm and a length of 30 cm, and polymerized therein at 220° C. for 2 hours while a swelling solvent gas mixture of p-xylene containing 41 vol. % of nitrogen (in terms of the volume ratio at the reaction temperature) was introduced into the autoclave at a flow rate of 3.6 cm/sec.

The polymer particulates obtained herein had a viscosity-average molecular weight of 35700. A sample of the polymer particulates obtained was shaped into plates through melt compression, and the plates were found colorless and transparent. The steam resistance of the plates was comparable to that of plates of a polycarbonate having been prepared through conventional interfacial polycondensation, and was good. The polymer formed did not fuse, and its recovery from the reactor was easy.

EXAMPLE 7

90 g of the crystalline prepolymer and 150 g of the amorphous prepolymer both prepared in Example 4 were put into a high-speed stirring reactor, and stirred therein at 1500 rpm while being cooled with water to produce prepolymer mixture particulates of nearly true spheres having a mean grain size of 0.61 mm.

The prepolymer mixture particulates prepared herein were polymerized at 210° C. in the same manner as in Example 6, except that p-xylene containing 50 wt. % of n-heptane was used as the swelling solvent gas mixture.

The polymer particulates obtained herein had a viscosity-average molecular weight of 29800. A sample of the polymer particulates obtained was shaped into plates through melt compression, and the plates were found colorless and transparent. The polymer formed did not fuse, and its recovery from the reactor was easy.

EXAMPLE 8

150 g of the crystalline prepolymer and 40 g of the amorphous prepolymer both prepared in Example 4 were put into a high-speed stirring reactor, and stirred therein at 1500 rpm while being cooled with water to produce prepolymer mixture particulates of nearly true spheres having a mean grain size of 0.47 mm.

The prepolymer mixture particulates prepared herein were polymerized at 220° C. in the same manner as in Example 3, except that p-xylene containing 50 wt. % of n-heptane was used as the swelling solvent gas mixture.

The polymer particulates obtained herein had a viscosity-average molecular weight of 33400. A sample of the polymer particulates obtained was shaped into plates through melt compression, and the plates were found colorless and transparent. The polymer formed did not fuse, and its recovery from the reactor was easy.

COMPARATIVE EXAMPLE 3

100 g of the amorphous prepolymer prepared in Example 4 was put into a 500-ml autoclave, melted at 260° C., and reacted for 2 hours therein while being heated up to 290° C. and well stirred under a pressure of 0.6 Torr. The polymer obtained herein had a viscosity-average molecular weight of 24800. However, opposed to the colorless polymers obtained in the above-mentioned Examples, the polymer obtained herein was much colored in dark brown even though the melt interesterification was effected herein with full purging with nitrogen.

COMPARATIVE EXAMPLE 4

The prepolymer mixture prepared in Example 4 was polymerized in a solid phase in the same manner as in Example 5, except that only nitrogen was introduced into the reactor at a flow rate of 5.8 cm/sec. In this, the solid-phase polymerization was effected in the inert gas stream.

Immediately after the start of the polymerization, semi-molten prepolymers adhered onto the wall surface of the reactor, and their amount increased during the polymerization. A sample of the polymer formed herein was shaped into plates through melt compression, and the plates were satisfactorily colorless and transparent. However, the polymer formed herein had a viscosity-average molecular weight of 9700, and the plates of the polymer were very brittle. In addition, as compared with the reaction speed in the process of the invention as demonstrated in the previous Examples, the reaction speed in this Comparative Example was much low, and the reaction herein took a long period of time.

INDUSTRIAL APPLICABILITY

As has been mentioned hereinabove, the present invention does not require crystallization of prepolymer prior to solid-phase polymerization thereof. In the invention, therefore, amorphous prepolymer can be directly polymerized in a solid phase to increase its molecular weight, and the polymerization time can be much reduced.

In the solid-phase polymerization of the invention using a swelling solvent gas, the polymerization speed is high and ketones and phenols to be formed as side products can be removed efficiently. The solid-phase polymerization of the invention is much superior to any conventional ones, as the reaction time for it is much reduced and it does not require crystallization of prepolymer.

What is claimed is:

1. A process for producing polycarbonate, which comprises polymerizing an essentially amorphous polycarbonate prepolymer in a solid phase under an atmosphere containing a swelling solvent gas.

2. A process for producing polycarbonate, which comprises polymerizing an essentially amorphous polycarbonate prepolymer in a solid phase under an atmosphere containing a swelling solvent gas, while the prepolymer is kept in a fluid state.

3. The process for producing polycarbonate as claimed in claim 1 or 2, wherein the solid-phase polymerization is effected under an atmosphere containing a swelling solvent gas and at least one gas selected from the group consisting of poor solvent gases and inert gases.

4. The process for producing polycarbonate as claimed in, claim 1 or 2, wherein a mixture comprising an essentially amorphous polycarbonate prepolymer and a crystalline polycarbonate prepolymer is polymerized.

5. The process for producing polycarbonate as claimed in, claim 1 or 2, wherein the essentially amorphous polycarbonate prepolymer is a particulate one.

6. The process for producing polycarbonate as claimed in claim 4, wherein the crystalline polycarbonate prepolymer is a particulate one.

7. The process for producing polycarbonate as claimed in claim 5, wherein the crystalline polycarbonate prepolymer is a particulate one.

8. The process for producing polycarbonate as claimed in claim 1 or 2, wherein the essentially amorphous polycarbonate prepolymer has a degree of crystallinity of not larger than 5%.

9. The process for producing polycarbonate as claimed in claim 1 or 2, wherein the swelling solvent gas is an aromatic hydrocarbon, an ether or a ketone.

10. The process for producing polycarbonate as claimed in claim 9, wherein the swelling solvent gas is an aromatic hydrocarbon having from 6 to 20 carbon atoms.

11. The process for producing polycarbonate as claimed in claim 9, wherein the swelling solvent is at least one selected from the group consisting of benzene, toluene, xylene, ethylbenzene, diethylbenzene, propylbenzene, dipropylbenzene, tetrahydrofuran, dioxane, anisole, methyl-ethyl ketone and methyl isobutyl ketone.

12. The process for producing polycarbonate as claimed in claim 3, wherein the poor solvent gases are selected from the group consisting of cyclic hydrocarbons having from 5 to 20 carbon atoms, linear or branched, saturated hydrocarbons having from 4 to 18 carbon atoms, and unsaturated lower hydrocarbons having from 6 to 10 carbon atoms.

13. The process for producing polycarbonate as claimed in claim 12, wherein the poor solvent gases are heptane, octane, nonane or cyclohexane.

14. The process for producing polycarbonate as claimed in claim 3, wherein the inert gases are selected from the group consisting of at least one of nitrogen, carbon dioxide, argon and helium.

* * * * *